United States Patent [19]

Holliday

[11] 4,094,602

[45] June 13, 1978

[54] MICROFORM CARD ALIGNMENT DEVICE

[75] Inventor: Robert George Holliday, Ann Arbor, Mich.

[73] Assignee: Xerox Corporation, Stamford, Conn.

[21] Appl. No.: 814,251

[22] Filed: Jul. 3, 1977

[51] Int. Cl.² .................. G03B 27/32; G03B 27/42
[52] U.S. Cl. ...................................... 355/40; 355/25; 355/53
[58] Field of Search ................................. 355/23–26, 355/39, 40, 54, 125, 132, 133, 53, 64, 75–77

[56] References Cited

U.S. PATENT DOCUMENTS

| 1,786,070 | 12/1930 | Jones | 355/125 |
| 2,282,768 | 5/1942 | Pickett | 355/25 |
| 2,866,397 | 12/1958 | Gillette | 355/40 X |
| 3,669,537 | 6/1972 | Kobayashi | 355/64 X |
| 3,798,782 | 3/1974 | Lindahl | 355/132 X |

Primary Examiner—Donald A. Griffin
Attorney, Agent, or Firm—James J. Ralabate; Eugene F. Miller; William A. Henry

[57] ABSTRACT

A device for uniformly aligning each of a series of microform cards with a projected test pattern, including means for moving a card relative to said test pattern, and means for perforating the card while aligned.

1 Claim, 12 Drawing Figures

MICROFORM CARD ALIGNMENT DEVICE

BACKGROUND OF THE INVENTION

This invention relates to a method and associated apparatus, for producing commercially-acceptable paged material stored on microfiche cards and reproduced on hard copy on an office-type microprint copier or duplicator.

The idea of micro-photographing and storing paged material to be reproduced subsequently only on demand is not new. Where small quantities of, e.g., books are desired, the idea of using a microform to hard copy device, such as an office microprint copier, has been proposed. The difficulty is in producing books which are commercially acceptable, and are not obvious copies. A major problem is aligning the print areas to have approximately the same margins, as do commercially printed books. This has been practically unattainable when using a microprint copier, because of image positioning variables introduced in (a) micro-photographing the pages to produce the microform frames; (b) positioning the microform frame in its holder relative to the optical imaging path of the copier; and (c) reverse-side copying, or duplexing, to produce the desired book effect. Slight spatial imaging variations in any of the above steps result in relatively large, generally unacceptable print-margin offsets from page to page of the reproduced paged material.

SUMMARY OF THE INVENTION

It is a principal object of this invention to provide a method and associated apparatus for office-type copier reproduction of microformed paged material, having print margin uniformity from page to page. The associated apparatus comprises a device for accurately perforating a series of microform cards to uniformly align the corresponding frames of a card series. A further apparatus comprises a novel adjustable microform holder for adjusting a microform card position to the particular optical path of a given microprint copier.

DETAILED DESCRIPTION OF THE INVENTION

Figure 1:
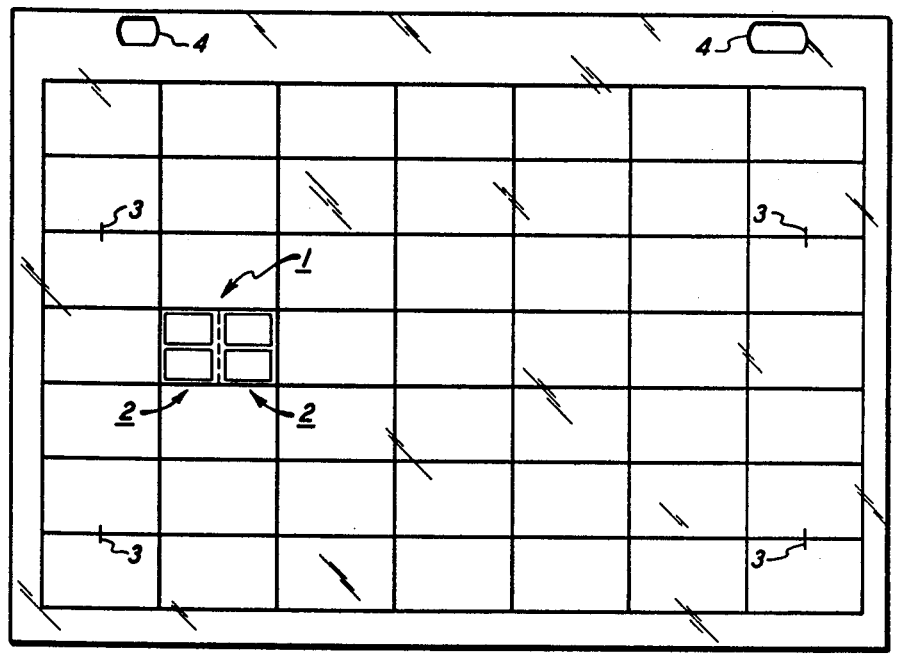
FIG. 1 is a schematic representation of a microform card used in this invention with one set of imaged frames drawn for demonstration purposes.

Using a book as an example, the first step in this invention is to micro-photograph an existing book to produce a standard microfiche card with a series of microimages of the pages. The book covers are removed and the pages are separated and arranged, one or more at a time, on a format sheet which is photographed to produce one microform frame. However, since the object of this invention is to accurately repeat page print margins, each format sheet photographed should contain the same number of original book pages, which in turn should always occupy the exact same portions of all the format sheets photographed. For example, using a Dietzgen Model 4330-E microfiche camera, the lens photographs an area of 11 5/16 × 18 ¾ inches at a distance of 33 inches. Using pages of 6 × 9 inches of an original book, four pages may be arranged on a format sheet sideways to be micro-photographed at one time, per frame, as shown in FIG. 1. Thus, for a book page of given size, a master format sheet can be prepared with pre-marked areas to be occupied by the pages for each frame. Opaque blocks may be used, for example, to mark the page areas. Then, semi-opaque format sheets for each frame may be placed over the master, and book pages are then placed directly over the opaque areas and fixed thereon for photographing. Any suitable method for aligning the format sheet with the focal area of the camera may be used; e.g., a fixed pin bar for holding the sheet in the proper position, etc.

At this point, a distinction must be drawn between the size of the frame seen by the camera, and the size of the microfiche frame reproduced per exposure by the particular copier used. Hereafter, the former will be referred to as the camera frame and the latter as the copier frame. For example, the Dietzgen microfiche camera will produce a frame on a microfiche card twice as long across the card as that which is reproduced by a Xerox Model 970 Microprinter per exposure. Therefore, in this instance, when a camera frame is taken, the image area should consist of two equal areas which may be separately reproduced by the copier without breaking the continuity of the printed matter. FIG. 1 contains a representation of a microfiche card which can be used in this invention. This is a modification of NMA standard microfiche format type 1, normally having 14 columns across and 7 rows down. It measures 148 millimeters across and 105 millimeters down, with 4 millimeter margins at the sides and bottom. The frame size is normally 10.0 millimeters across by 12.5 down; however, as depicted, the frame is 20.0 by 12.5, since the fiche camera produces a frame of that size. The camera frame 1 is seen to contain four micro-images of book pages. The vertical dotted line schematically separates frame 1 into two copier frames 2, each frame being the size reproduced per exposure of a Xerox 970. Thus, as seen by the Xerox 970, the card is, in fact, separated into a 14 × 7 format.

The next step in the method of this invention is to micro-photograph the original book pages, arranged on format sheets, in a first sequence. In one instance, where, for example, the size of the pages to be photographed permits only one per copier frame, the front sides of the pages can be photographed in the first sequence; or, alternatively, the back sides of all the pages; or, in other words, using page numbers, photograph all the even-numbered pages, or all the odd-numbered pages.

A preferred sequence, where, as in FIG. 1, the page size permits the micro-grouping of two pages per copier frame, is to start from the center of the book, and, looking down through the book, photograph left-right page pairs. E.G., if the book has 400 pages, the center would have page 200 on the left and page 201 on the right; then going down, page 198 left and 203 right; page 196 left and 205 right; and so forth. These pairings would be photographed. The advantages of this latter grouping will become apparent.

Having completed the first sequence, a new card or series of cards is produced by photographing a second sequence of book pages, which correspond to the reverse sides of the pages photographed in the first sequence. In other words, where the first sequence consists of the odd-numbered pages, the second sequence would consist of the even-numbered reverse sides thereof. In the case of the left-right grouping just described, the reverse pairings would be photographed; e.g., page 199 left and 202 right, 197 left and 204 right, 195 left and 206 right, etc.

The object in producing the two sequences of microfiche cards is to ultimately enable sequential duplex reproduction of pages in book form. When the first sequence is copier reproduced on one side of each copy paper, the copies will be flipped and reinserted in the copier for reproduction of the second sequence on the reverse sides thereof in the desired order.

It is essential that each microfiche card in a given page series be registered in the fiche holder of a microprint copier exactly as every other card. Basically, this means that the print areas of the corresponding frames of each card would coincide if registered as a stack. Since, as will be described, the microprinter fiche holder of this invention contains one or more pins which fit card perforations to hold the card during scanning, it will be clear that the perforations must be accurately produced for proper card registration.

Figure 3:
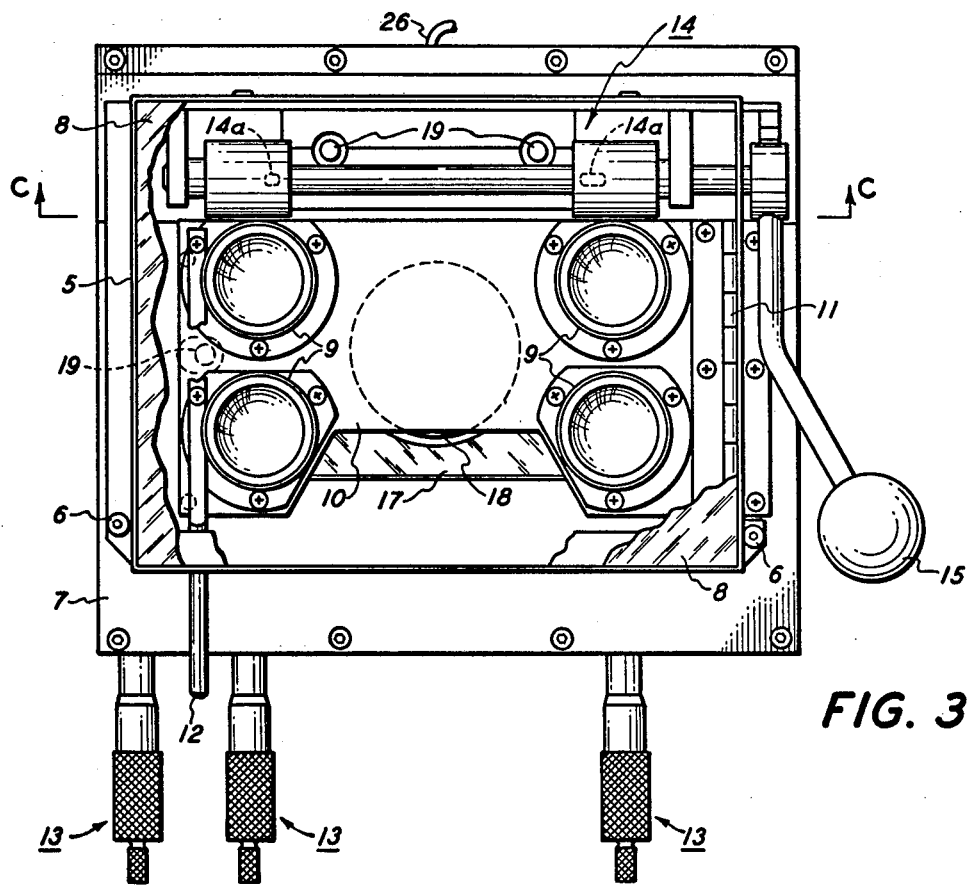
FIG. 3 is a top view thereof with the cover top broken away.
Figure 2:
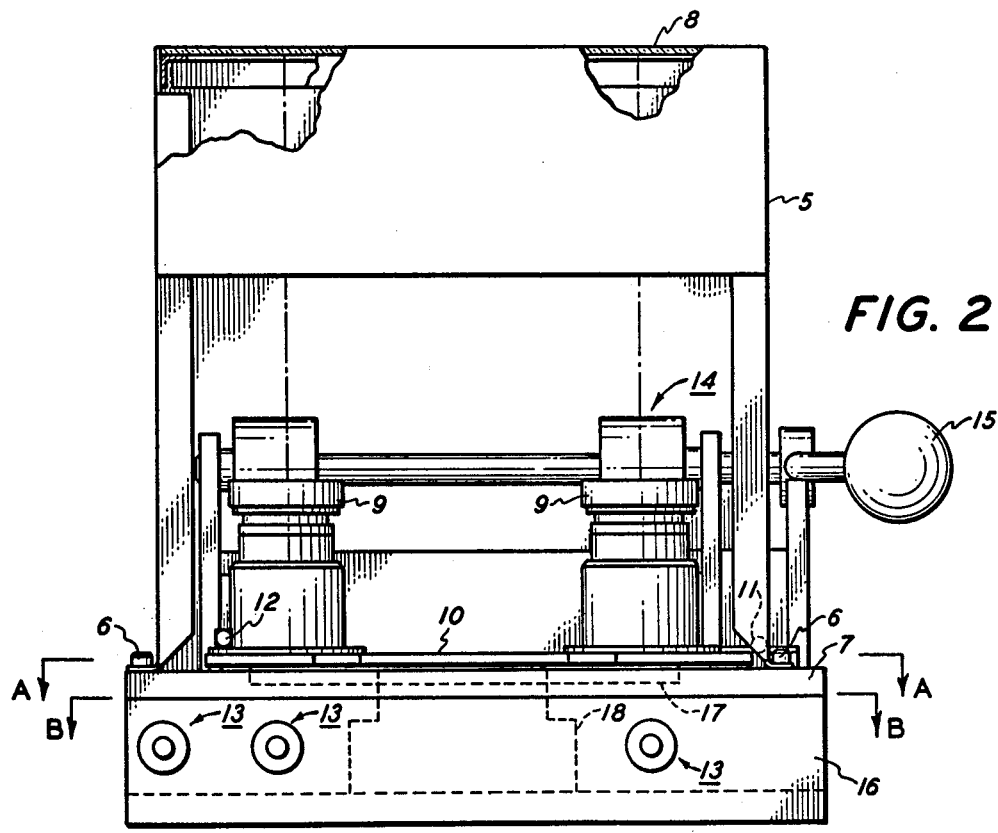
FIG. 2 is a front view of the microform alignment device of this invention.
Figure 7:
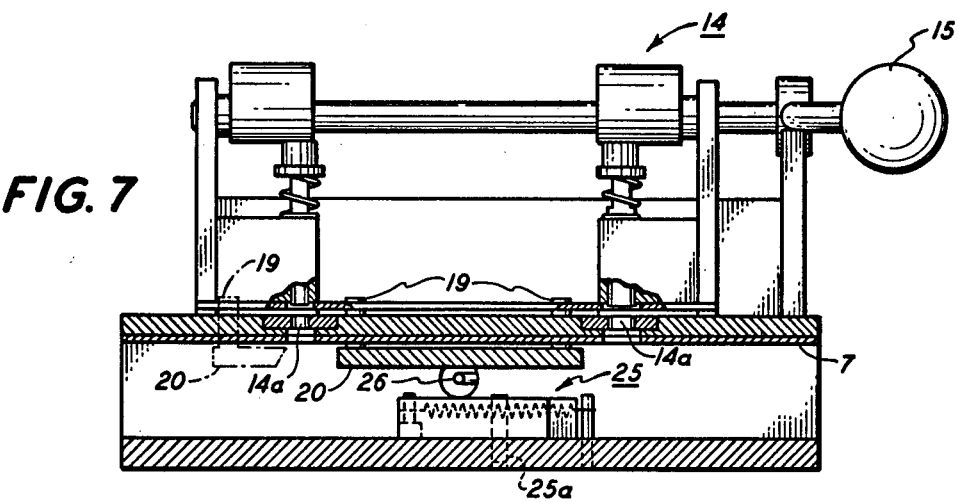
FIG. 7 is a section view thereof along line C—C of FIG. 3.

This is accomplished in this invention by means of a novel alignment device. Referring to FIGS. 2 and 3, the front and top of the device are respectively shown schematically. A cover 5 partially encloses the device, and is secured by screws 6 to a plate 7. The cover can be of any suitable thin sheet material, such as plastic or metal, and in the embodiment shown, is solid at the rear and sides, and extends part way down the front, as can be seen in FIG. 2. The top of the cover is a rear projection surface 8, which is broken away in FIG. 3 to show other assembly details. The projection surface is designed to display a test pattern and microfiche card markings projected from beneath, and can be of any suitable material such as ground glass. The test pattern and card markings are projected by means of four magnification lenses 9, which are mounted on a plate or lens board 10 which is rotatably mounted on plate 7 by means of hinge 11. A handle 12 is fixed to plate 10 to provide manual opening and closing of the lens board. The position of the microfiche card is adjusted by means of three micrometers 13, the function of which will be described below. A matrix punch assembly 14, is mounted at the rear of the device on plate 7 for perforating the fiche card. Punch handle 15 is pulled down to effect puncture of the card after it has been aligned. FIG. 7 shows the punch assembly in more detail.

Figure 4:
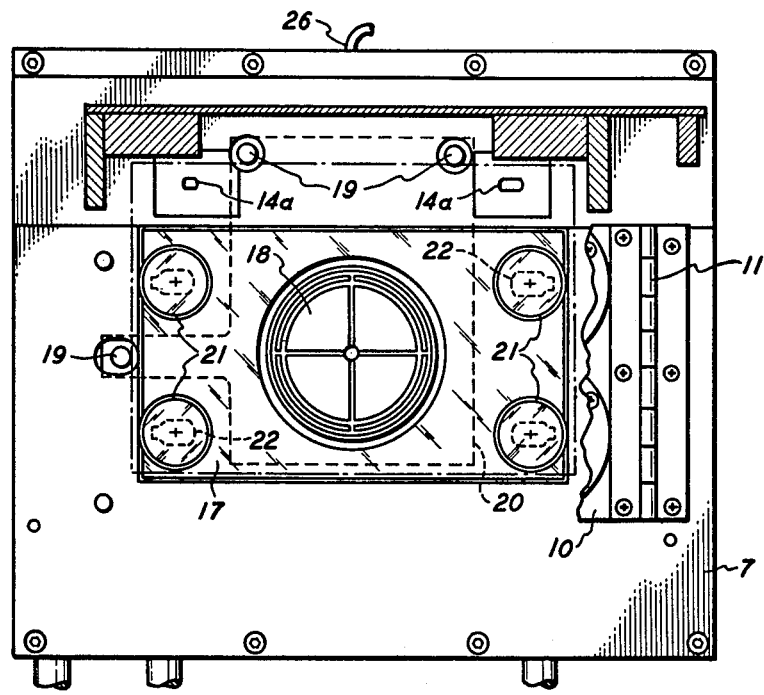
FIG. 4 is a section view thereof along line A—A of FIG. 2.
Figure 5:
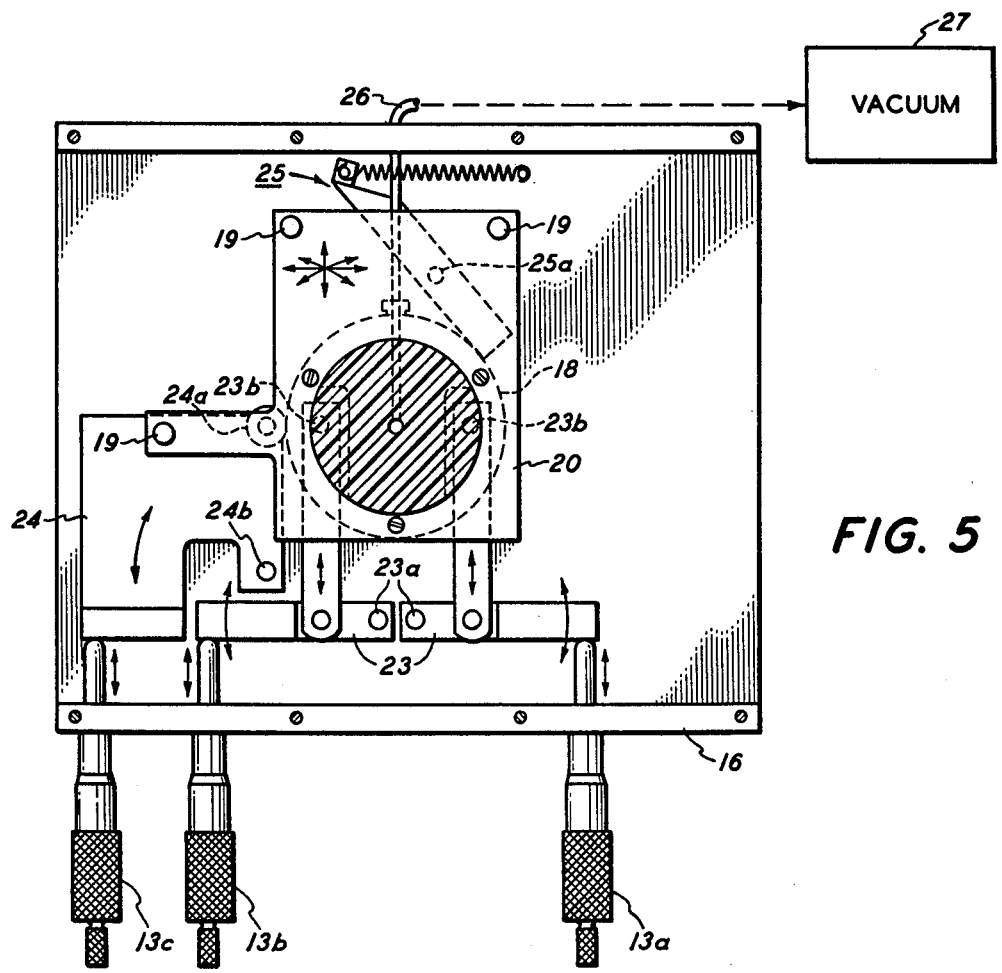
FIG. 5 is a section view thereof along line B—B of FIG. 2.
Figure 6:
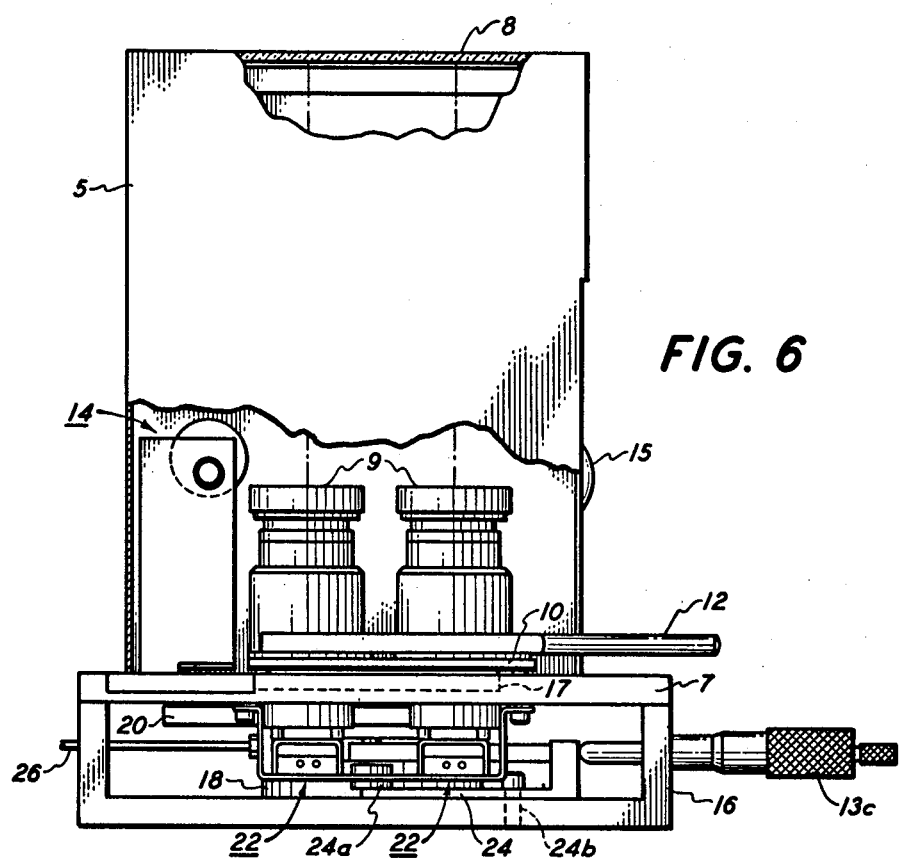
FIG. 6 is a left-side view thereof with the cover partially broken away.

FIG. 4 is a section view along line A—A of FIG. 2, essentially showing the features of plate 7 with the lens board 10 broken away. FIG. 5 is a section view along line B—B of FIG. 2, showing the details of frame 16 and the adjusting mechanism beneath plate 7 supported thereby. Plate 7 contains a rectangular glass platen 17 for partially retaining the microfiche card, and has a circular opening through which a cylindrical vacuum puck 18 protrudes. The top of the puck is approximately level with the platen. Card registration pins 19, supported from beneath on a registration plate 20 shown in FIG. 5 and dotted in in FIG. 4, extend through and above openings in plate 7. At the corners of the glass platen 17 are four lens spots 21, which can be illuminated from below, each containing in the center a micro-etched cross-hair pattern, all four of which, when projected and enlarged through lenses 9, comprise the test pattern for aligning the microfiche. Lenses 9 coincide with lens spots 21 when lens board 10 is atop the platen 17. Light bulbs 22 are fixed to the bottom of plate 7 to provide the projection illumination, as shown in more detail in FIG. 6.

Referring to FIG. 5, the vacuum puck 18 is secured to registration plate 20 by screws, and the bottom of the puck rides on the floor of frame 16. Plate 20 is movably connected to arm assemblies 23, pivotally secured to frame 16 at points 23a. One end of the arm assemblies abut micrometers 13a and 13b as shown, and the other ends thereof are connected to the underside of puck 18 by pins 23b. Another plate 24, having a roller 24a adapted to impinge puck 18, is also pivotally mounted on frame 16 at point 24b, and contacts micrometer 13c as shown. Opposing the movements of the three micrometers is a spring arm assembly 25, pivoted at point 25a on frame 16 and contacting the puck as shown. With the puck 18 and plate 20 thus biased, the right side thereof may be moved up or down by moving micrometer 13a in or out of frame 16; the left side with micrometer 13b; and the puck may be moved from side to side by moving micrometer 13c. In all cases, the spring arm assembly urges the puck back toward its original position when the micrometers are moved out of the frame. FIG. 7, which is a section view along line C—C in FIG. 3, also illustrates the positioning of the spring arm assembly.

In use, as will be described, the vacuum puck will be connected to a vaccum source in order to facilitate movement of the microfiche card. In FIG. 5 a channel 26 is shown connecting the top center, and thus the grooves, of puck 18 to a vacuum source 27.

The use of this device in practicing the method of this invention will now be described. Initially, a series of microfiche cards containing micro-imaged book pages are prepared as described before. Thin vertical hair marks 3 (see FIG. 1) are made on each card by drawing hash marks with a pencil on the bottom middle and top middle of the format sheets for the camera frames at rows 2 and 3, column 1; rows 2 and 3, column 7; rows 6 and 7, column 1; and rows 6 and 7, column 7. In this way, the horizontal lines separating the frames can also be used during alignment, where they meet the vertical hash marks. The particular separation of the marks 3 is determined by the separation of the lens spots 21 on the glass platen 17, since the marks 3 must eventually be aligned with the patterns etched on the lens spots 21. The lens spots separation is a relatively arbitrary parameter. Obviously, the area defined thereby must be smaller than, and within the bounds of, the area of a microfiche card. Additionally, the spots must be far apart enough so that the four projected test patterns do not overlay or blend into each other on the viewing surface. Beyond those considerations, any spot separation is workable. In the particular case of the cardtype shown in FIG. 1, the centers of lens spots 21 should be spaced to form a rectangle of about 50 millimeters length and 120 millimeters width. Each card in turn, then, is placed between the lens board 10 and the platen 17, by lifting the lens board handle 12 upward and inserting the card until the card impinges on all three registration pins 19. The spacing of the pins is such that the vertical hair marks on the card come close to coinciding with the etched cross-hair patterns on the lens spots 21 when the card is registered against the pins. The lens board is then brought down on top of the card. The card at this time rests on both the platen 17 and the grooved top of the vacuum puck 18, since the latter is approximately level with the plate. The projection bulbs and vacuum source are then turned on. When the vacuum is drawn, the card is pulled down forcefully enough against the puck and away from the bottom of the lens board to allow free movement of it when the puck and plate 20 are adjusted by the micrometers.

Figure 8:
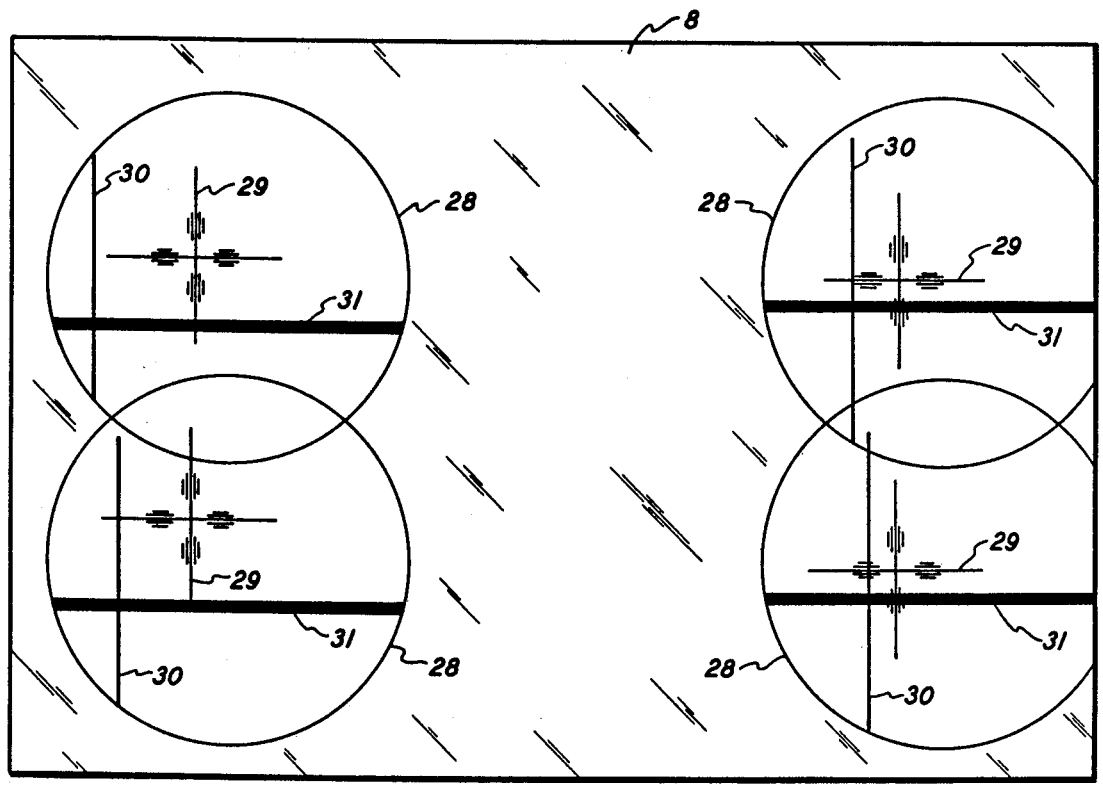
FIG. 8 is a representation of the cover top of the device with projected test pattern and microform alignment marks.

Referring now to FIG. 8, shown there is a representation of the image appearing on the top projection surface 8 of the apparatus cover 5, when a card has been inserted. Four illuminated areas appear, corresponding, of course, to the images projected by each of the four projection lenses 9. Each area contains a magnified image of the etched cross-hair pattern 29 and the vertical hair mark 30 on the card. The horizontal double line 31 joining vertical mark 30 is the space between camera frames on the card. The object, then, is to align as closely as possible the intersection points of lines 30 and 31 with the center points of the four cross-hair patterns 29, and lines 30 and 31 with the center lines of the test patterns as well. This is attempted by maneuvering the position of the vacuum puck, and thus the card, with the micrometers. By adjusting the horizontal lines and vertical lines separately, the patterns can be made to overlap. If the camera used to produce the microfiche in the first instance is not perfect, the frames will be slightly offset, one to the other. Thus, perfect alignment will not be possible. Therefore, using visual approximation, the best compromise should be used. In any event, when the best possible alignment has been obtained, the card is then perforated by bringing down the punch handle 15 while the card is in alignment with the test pattern. By thus perforating each card in the series, the frames thereon are aligned from card to card.

The exact dimensions of the alignment device just described are not critical with the exception of the distances between the cross-hair patterns on the lens spots 21. With these parameters fixed as described above, the remaining design is at the discretion of the engineer. The projection lenses must obviously be superposed directly over the lens spots. However, any suitable method and apparatus may be used for moving the microfiche card relative to the test pattern. Also, the projection surface need not be included in the housing, but may be, for example, external to the device with proper optical modifications. It is essential though that the perforating apparatus be positioned in the device to punch the card while the card is in test pattern alignment.

Figures 9, 9A, 10, 11:
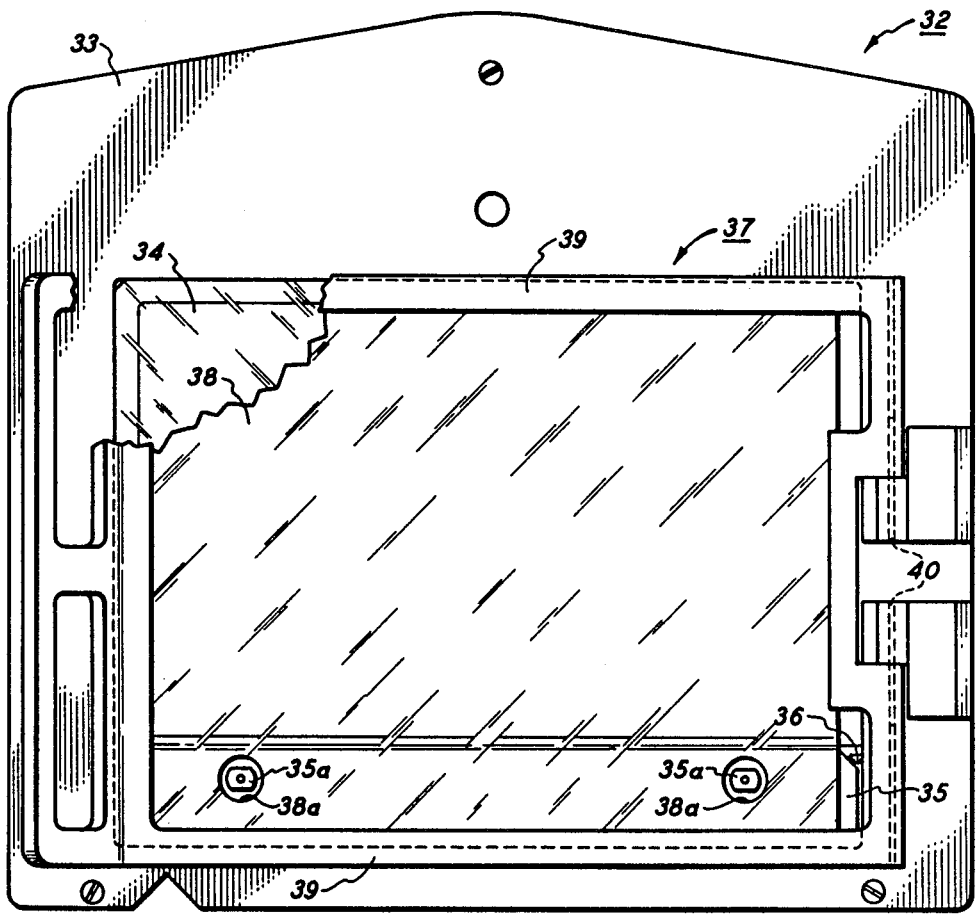
FIG. 9 is a partial top view of the base frame of the microform card holder.
FIG. 9A is a section view along line X—X of FIG. 9.
FIG. 10 is a top view of the entire holder with the cover partially broken away.
FIG. 11 is a front view thereof with the cover closed and opened, with partial breakaway.

After the card series has been uniformly perforated, the next step in the process of this invention is to reproduce, in blown-up size, the microformed book pages using an appropriate copier, or microprinter, such as a Xerox Model 970. However, another potential undersirable print margin variable may occur; i.e., the print portion of the copy may not be perfectly centered on the copy paper. This can result from any number of small inaccuracies in a copier, such as optical path, paper path, etc. It is, therefore, desirable to be able to adjust the position of the microfiche card in the microprinter card holder, such that these inaccuracies are overcome, and the print area of the copy is centered on the copy paper. To accomplish this, a novel microfiche card holder has been designed as shown in FIGS. 9-11. Most fiche holders simply employ a transparent openable sandwich held by a frame, which fits into the scanner of the microprinter. As seen in the drawings, the fiche holder 32 of this invention comprises a frame 33 containing a basically rectangular clear plate member 34 and an opaque bar member 35 adjacent one edge of the plate member and having raised pins 35a for engaging the microfiche card perforations. The bar member corners are cut at acute angles, preferably about 45°, with respect to the edges. As can be seen, frame 33 is drilled through from the sides to accept small set screws 36, which abut the angled corners of the bar member. The design allows just enough play between the bar and plate members that the bar may be moved small amounts by the set screws, and thus adjust the position of a fiche card held thereby. The area of the clear plate member 34 is, of course, greater than the microimage area of a standard microfiche card. Attached to frame 33 is a cover 37 comprising a clear plate 38 in a frame 39 attached by a hinge 40 to frame 33 for opening and closing. The cover plate 38 also has two openings 38a corresponding to the raised pins 35a on the adjustable bar member.

If, upon reproducing images from a microfiche card, it appears that the print area of the copy is not centered on the page, the appropriate set screws on the holder, and thus the bar member, should be adjusted, in trial and error fashion, until print area centering is achieved. That setting should then be proper for uniformly punched microfiche cards. Obviously, although the specific holder is shaped to fit a Xerox Model 970 microprinter, the invention embodied therein is perfectly applicable to any microfiche holder design on any fiche printer, with any appropriate size or shape modifications.

As described above, with the fiche cards having been aligned with the device of this invention, and any necessary adjustments having been made to the fiche holder, the copier frames are then reproduced in a first sequence. These copies are then reinserted in the printer paper tray such that the other sides thereof will be the copy surfaces. A second sequence of copier frames on cards, representing the corresponding reverse sides of the first sequence of reproduced pages, is then run off to produce duplexed copies. Where each frame reproduced by the microprinter contains only one page, the duplexed stack of copies need only be bound to produce the book. However, where the situation in FIG. 1 exists, i.e., where each copier frame 2 reproduced by the microprinter per exposure can contain two microformed pages, the preferred, convenient method as mentioned before is to photograph the original book pages in left-right pairs going down through, or up toward the center of the book. The second sequence would be the reverse of the latter. Thus, in the 400-page book example, going down through the center, the duplexed copies would, for example, start with pages 200-201 on one side of the first copy and pages 199-202 on the reverse, pages 198-203 backed by pages 197-204 on the second, and so on down to the last copy having pages 2-399 backed by pages 1-400. This stack of copies may then be cut at the middle of each copy and the two half stacks can be brought together face to face to produce the book. Where the original book has an uneven number of printed pages, then a blank page would be used as the first or last page to produce an even number.

The method of this invention is independent of any specific device used to produce the uniformly-perforated fiche cards, and is considered to embrace any procedure which results in frame-to-corresponding-frame spatial uniformity of a series of microfiche cards, as perforated for use in a microprinter apparatus. Likewise, the alignment device is considered to embrace any movable means for securing the microfiche card while the card is being aligned with the test pattern, and then perforated. Many variations within the scope of the inventions herein will occur to those skilled in the art.

I claim:

1. An apparatus for aligning a series of microform cards with a spatially-defined test pattern, comprising:
   (a) a platen having at least one substantially transparent area bearing a spatially-defined test pattern;
   (b) means for retaining a microform card upon said platen and said test pattern;
   (c) optical means proximate said platen for projecting said test pattern and that portion of said microfiche card overlapping thereon onto a viewing surface;
   (d) adjustable means in contact with said retaining means for moving said retaining means and thus said microform card relative to said platen and said test pattern; and
   (e) means for perforating said microform card when said card is in contact with said retaining means.

* * * * *